(12) United States Patent
Kuo

(10) Patent No.: US 8,699,144 B2
(45) Date of Patent: Apr. 15, 2014

(54) OPTICAL ZOOM LENS ASSEMBLY

(75) Inventor: Jui-Hsiung Kuo, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/538,373

(22) Filed: Jun. 29, 2012

(65) Prior Publication Data

US 2013/0314799 A1 Nov. 28, 2013

(30) Foreign Application Priority Data

May 25, 2012 (TW) .............................. 101118777 A

(51) Int. Cl.
*G02B 15/00* (2006.01)
(52) U.S. Cl.
CPC ...................... *G02B 15/00* (2013.01)
USPC .......................................... 359/682; 359/689
(58) Field of Classification Search
CPC ................................ G02B 15/00; G02B 15/14
USPC .................. 359/680–682, 686, 689
See application file for complete search history.

(56) References Cited

U.S. PATENT DOCUMENTS

| | | | | |
|---|---|---|---|---|
| 6,977,778 | B2 * | 12/2005 | Nose et al. | 359/680 |
| 7,079,326 | B2 * | 7/2006 | Hirakawa | 359/682 |
| 7,180,679 | B2 * | 2/2007 | Nose et al. | 359/682 |
| 8,085,477 | B2 * | 12/2011 | Mihara et al. | 359/682 |
| 2005/0231817 | A1 * | 10/2005 | Matsusaka et al. | 359/680 |

* cited by examiner

*Primary Examiner* — Darryl J Collins
(74) *Attorney, Agent, or Firm* — Muncy, Geissler, Olds & Lowe, P.C.

(57) ABSTRACT

This invention discloses an optical zoom lens assembly, sequentially arranged from an object side to an image side along an optical axis comprising: a first lens-group, a second lens-group and a third lens-group. The first lens-group with negative refractive power comprises at least one positive lens, and at least one negative lens. The second lens-group with positive refractive power comprises at least one positive lens, and at least one negative lens. The third lens-group with a positive refractive power comprises at least one aspheric lens. Therein, refractive indexes of the first lens-group, the second lens-group and the third lens-group are small than 1.69. Therefore, the present invention can reduce manufacturing costs and provide good image quality to be applied to cameras, cell phone cameras and other devices.

9 Claims, 7 Drawing Sheets

OPTICAL ZOOM LENS ASSEMBLY

CROSS-REFERENCE TO RELATED APPLICATION

This application claims the benefit of Taiwan Patent Application No.101118777, filed on May 25, 2012, in the Taiwan Intellectual Property Office, the disclosure of which is incorporated herein in its entirety by reference.

BACKGROUND OF THE INVENTION

1. Field of the Invention

The present invention relates to an optical zoom lens assembly, and more particularly to the optical zoom lens assembly comprised of three groups of plastic lenses and may apply in an electronic product.

2. Description of Related Art

In general, a zoom lens allows a user to capture a scene easily by changing a focal length at a same location. At the same time, the zoom lens can substitute a plurality of fixed lenses, so that the user needs not to carry many lenses for photography or spend much money on the lenses. Thereby, the zoom lens becomes a favorable tool to photographers.

However, the zoom lens generally comes with a complicated assembly and components, so that the zoom lens is usually large, heavy and long. To overcome the problems of the complicated assembly and components and a low image quality, the cost of the zoom lens has to become higher.

In order to provide a more practical design of the present invention, the lenses of the three lens-groups are made of plastic, so that the zoom lens can achieve the effects of maintaining a high-quality imaging capability, reducing the manufacturing cost, and being applicable in electronic products.

SUMMARY OF THE INVENTION

Therefore, it is a primary objective of the invention to provide an optical zoom lens assembly, sequentially arranged from an object side to an image side along an optical axis comprising: a first lens-group, a second lens-group and a third lens-group. The first lens-group with negative refractive power includes at least one positive lens and at least one negative lens. The second lens-group with positive refractive power includes at least one positive lens and at least one negative lens. The third lens-group with positive refractive power includes at least one aspherical surface. Wherein, the first lens-group, the second lens-group and the third lens-group have refractive indexes smaller than 1.69. The second lens-group has a focal length of $f_2$, a third lens of the second lens-group has a focal length of $f_{21}$, and the condition of $0.3 < f_{21}/f_2 < 0.8$ is satisfied.

Preferably, the first lens-group, sequentially arranged from an object side to an image side along an optical axis, may comprise a first lens and a second lens; the first lens with negative refractive power has a concave object-side surface and a concave image-side surface; and the second lens with positive refractive power has a convex object-side surface and a concave image-side surface.

Preferably, the image-side surface of the first lens, and the object-side surface or the image-side surface of the second lens are aspherical surfaces.

Preferably, the second lens-group, sequentially arranged from the object side to the image side along the optical axis, may comprise the third lens, a fourth lens and a fifth lens; the third lens with positive refractive power has a convex object-side surface and a convex image-side surface; the fourth lens with negative refractive power has a concave object-side surface and a concave image-side surface; and the fifth lens with negative refractive power has a convex object-side surface and a concave image-side surface.

Preferably, the object-side surface of the third lens or the object-side surface or the image-side surface of the fifth lens is an aspherical surface.

Preferably, the third lens-group may include a sixth lens with positive refractive power, having a concave object-side surface and a convex image-side surface.

Preferably, the object-side surface or the image-side surface of the sixth lens is an aspherical surface.

It is another objective of the present invention to provide an optical zoom lens assembly, sequentially arranged from an object side to an image side along an optical axis, comprising: a first lens-group, a second lens-group and a third lens-group. The first lens-group comprises: a first lens with negative refractive power, having a concave object-side surface and a concave image-side surface; and a second lens with positive refractive power, having a convex object-side surface and a concave image-side surface. The second lens-group comprises: a third lens with positive refractive power, having a convex object-side surface and a convex image-side surface; a fourth lens with negative refractive power, having a concave object-side surface and a concave image-side surface; and a fifth lens with negative refractive power, having a convex object-side surface and a concave image-side surface. The third lens-group comprises a sixth lens with positive refractive power, having a concave object-side surface and a convex image-side surface. Wherein, the first lens-group, the second lens-group and the third lens-group have refractive indexes smaller than 1.69; and the second lens-group has a focal length of $f_2$, and the third lens has a focal length of $f_{21}$, and the condition of $0.3 < f_{21}/f_2 < 0.8$ is satisfied.

Preferably, the first lens-group has negative refractive power, the second lens-group may have positive refractive power, and the third lens-group has positive refractive power.

Preferably, the image-side surface of the first lens, the object-side surface or the image-side surface of the second lens, the image-side surface of the third lens, the image-side surface of the fifth lens, and object-side surface or the image-side surface of the sixth lens are aspherical surfaces.

The lenses of the optical zoom lens assembly of the present invention are made of plastic and used to substitute the conventional zoom lenses made of glass, so as to facilitate the manufacture and lower the cost.

DETAILED DESCRIPTION OF THE PREFERRED EMBODIMENTS

The technical contents and characteristics of the present invention will be apparent with the detailed description of a preferred embodiment accompanied with related drawings as follows. For simplicity, the drawings are not necessarily drawn in actual scale or ratio, and same numerals are used in the following preferred embodiment to represent respective same elements. It is noteworthy that the drawings are provided for the purpose of illustrating the present invention, but not intended for limiting the scope of the invention.

The present invention provides an optical zoom lens assembly, sequentially arranged from an object side to an image side along an optical axis, comprising: a first lens-group, a second lens-group and a third lens-group. Wherein, the first lens-group with negative refractive power includes at least one positive lens and at least one negative lens. The second lens-group with positive refractive power includes at least one positive lens and at least one negative lens. The third lens-group with positive refractive power includes at least one aspherical surface.

Figure 1:
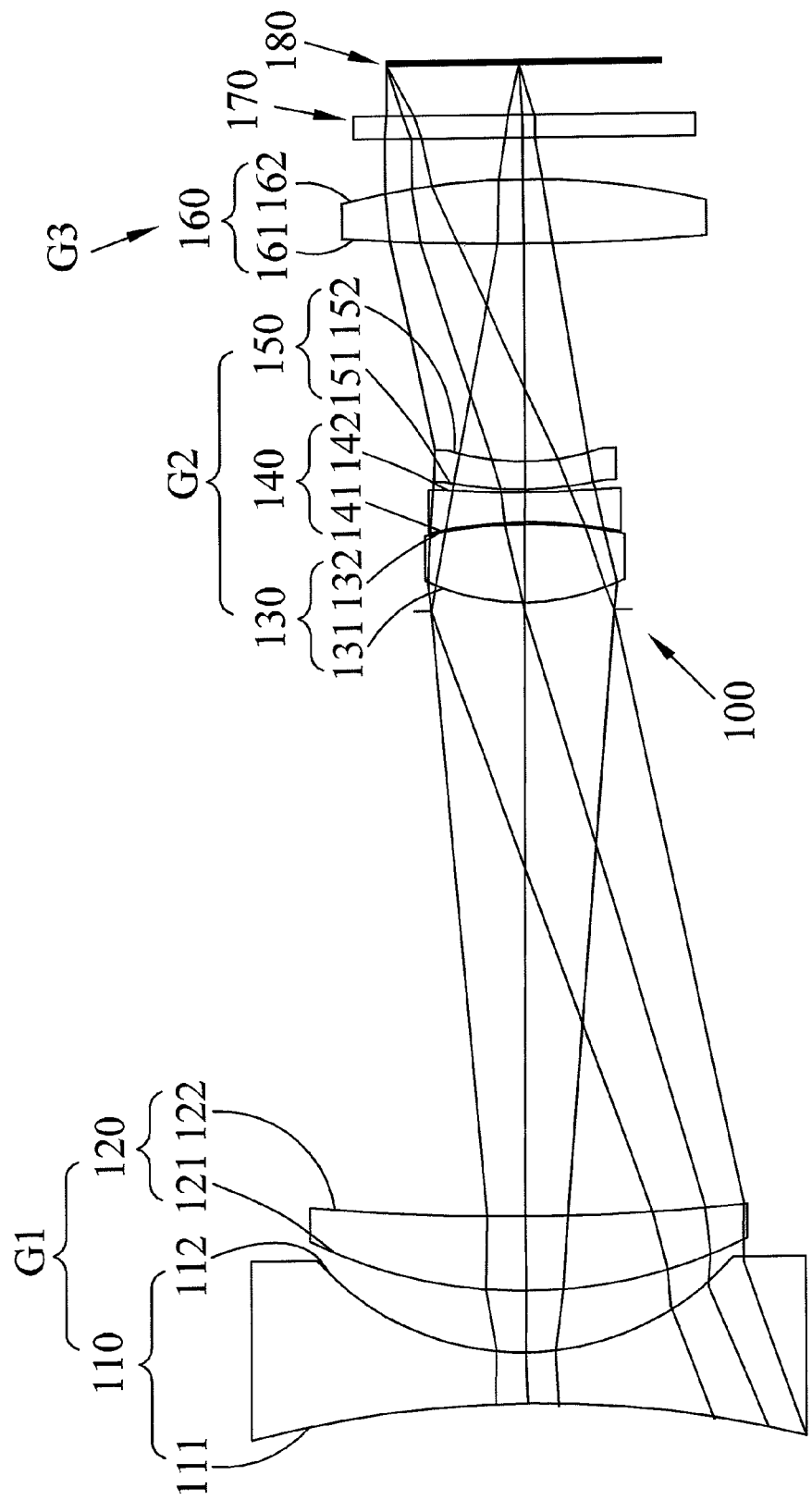
FIG. 1 is a first schematic view of an optical zoom lens assembly of the present invention.

With reference to FIG. 1 for the first schematic view of an optical zoom lens assembly of the present invention, the first lens-group G1 comprises a first lens 110 and a second lens 120; the second lens-group G2 comprises a third lens 130, a fourth lens 140 and a fifth lens 150; and the third lens-group G3 comprises a sixth lens 160. The optical zoom lens assembly, sequentially arranged from an object side to an image side along an optical axis, comprises: a first lens 110 with negative refractive power, made of plastic, having a concave object-side surface 111 and a concave image-side surface 112; a second lens 120 with positive refractive power, made of plastic, having a convex object-side surface 121 and a concave image-side surface 122; an aperture 100; a third lens 130 with positive refractive power, made of plastic, having a convex object-side surface 131 and a convex image-side surface 132; a fourth lens 140 with negative refractive power, made of plastic, having a concave object-side surface 141 and a concave image-side surface 142; a fifth lens 150 with negative refractive power, made of plastic, having a convex object-side surface 151 and a concave image-side surface 152; a sixth lens 160 with positive refractive power, made of plastic, having a concave object-side surface 161 and a convex image-side surface 162; and an infrared filter (IR-filter) 170 for adjusting a wavelength section of an image. With the assembly of the first lens-group G1, the second lens-group G2, the third lens-group G3, the aperture 100 and the IR-filter 170, an image of an object to be photographed can be formed on an image plane 180.

The optical zoom lens assembly comprises three lens-groups, the aperture 100 and the IR-filter 170. The aperture 100 is situated between the first lens-group G1 and the second lens-group G2. The IR-filter 170 is installed between the sixth lens 160 and the image plane 180 and generally made of an optical sheet material that does not affect the focal length of the optical zoom lens assembly of the present invention.

Wherein, one of the image-side surface 112 of the first lens 110, the object-side surface 121 or the image-side surface 122 of the second lens 120, the object-side surface 131 of the third lens 130, the object-side surface 151 or the image-side surface 152 of the fifth lens 150, and the object-side surface 161 or the image-side surface 162 of the sixth lens 160 or combinations thereof are aspherical surfaces, and the aforementioned lenses satisfies the aspherical surface formula as given in the following Equation (1):

$$X(Y) = \frac{(Y^2/R)}{1+\sqrt{(1-(1+K)(Y/R)^2)}} + \sum_i (A_i) \cdot (Y^i). \qquad (1)$$

wherein, X is the relative height of a point which has a distance Y from the aspherical surface from a tangent plane of the tip of the optical axis of the aspherical surface;

Y is the distance between a point on the curve of the aspherical surface and the optical axis;

R is the radius of curvature;

K is the conic coefficient; and

Ai is the $i^{th}$ level aspherical surface coefficient.

In the optical zoom lens assembly of the present invention, the first lens 110, the second lens 120, the third lens 130, the fifth lens 150 and the sixth lens 160 can be spherical surfaces or aspherical surfaces. For aspherical surfaces, the radius of curvature of the optical surface can be used for changing the refractive power to eliminate aberrations, so as to reduce the total length of the optical zoom lens assembly.

TABLE 1

Optical Data of the First Schematic View
f = 5.25 mm, Fno = 3.3

| Optical Surface | Lens-Group | | Radius of Curvature | Thickness or Distance(mm) | Refractive Index | Abbe No. |
|---|---|---|---|---|---|---|
| 0 | | Object to be photographed | | | | |
| 1 | First | First lens | −34.165 | 2 | 1.530 | 56.000 |
| 2 | lens-group | | 4.81(ASP) | 2 | | |
| 3 | | Second lens | 7.886(ASP) | 2.7 | 1.600 | 27.000 |
| 4 | | | 20.076(ASP) | 22.66 | | |
| 5 | | Aperture | ∞ | 0.3 | | |
| 6 | Second | Third lens | 4.947(ASP) | 2.7 | 1.530 | 56.000 |
| 7 | lens-group | | −9.789 | 0.1 | | |
| 8 | | Fourth lens | −11.616 | 0.6 | 1.600 | 27.000 |
| 9 | | | 13.073 | 0.1 | | |
| 10 | | Fifth lens | 4.0(ASP) | 0.6 | 1.530 | 56.000 |
| 11 | | | 3.659(ASP) | 4.07 | | |
| 12 | Third | Sixth lens | −85.587(ASP) | 2.2 | 1.530 | 56.000 |
| 13 | lens-group | | −13.257(ASP) | 1.5 | | |
| 14 | | IR-filter | ∞ | 0.8 | 1.516 | 64.000 |
| 15 | | | ∞ | 5.38 | | |

Note:
ASP stands for aspherical surface.

With reference to Table 1, the optical zoom lens assembly has a focal length f=5.25 (mm), such that the overall aperture value (f-number) Fno=3.3. Wherein, the second lens-group G2 has a focal length of $f_2$, and a third lens 130 of the second lens-group G2 has a focal length of $f_{21}$, and the condition: $0.3 < f_{21}/f_2 < 0.8$ is satisfied. It is noteworthy that a material with a refractive index smaller than 1.69 is used to manufacturing the first lens 110, the second lens 120, the third lens 130, the fourth lens 140, the fifth lens 150 and the sixth lens 160, so as to lower the manufacturing cost.

Wherein, the first lens 110, the second lens 120, the third lens 130, the fourth lens 140, the fifth lens 150 and to sixth lens 160 have object-side surface and image-side surface in compliance with the aspherical surface formula as given in Equation (1), and the aspherical coefficients are listed in Table 2.

a concave image-side surface 222; an aperture 200; a third lens 230 with positive refractive power, made of plastic, having a convex object-side surface 231 and a convex image-side surface 232; a fourth lens 240 with negative refractive power, made of plastic, having a concave object-side surface 241 and a concave image-side surface 242; a fifth lens 250 with negative refractive power, made of plastic, having a convex object-side surface 251 and a concave image-side surface 252; a sixth lens 260 with positive refractive power, made of plastic, having a concave object-side surface 261 and a convex image-side surface 262; and an IR-filter 270, for adjusting a wavelength section of an image. With the assembly of the first lens-group G1, the second lens-group G2, the third lens-group G3, the aperture 200 and the IR-filter 270, an image of an object to be photographed can be formed on an image plane 280.

TABLE 2

Aspherical Coefficients

| Surface | 2 | 3 | 4 | 6 | 10 | 11 | 12 |
|---|---|---|---|---|---|---|---|
| k= | −5.390E−01 | −7.190E−01 | 6.381E+00 | −2.890E−01 | 1.370E−01 | 2.040E−01 | 9.429E+01 |
| A4= | −7.630E−04 | −3.580E−04 | −3.930E−04 | 3.560E−04 | −1.020E−03 | 1.410E−03 | −3.527E−05 |
| A6= | −3.321E−06 | −5.056E−06 | −2.746E−06 | 1.613E−05 | −7.840E−04 | −9.480E−04 | −1.609E−05 |
| A8= | 4.942E−07 | 7.184E−07 | 4.233E−07 | 8.332E−07 | −4.214E−07 | 1.696E−05 | −4.350E−06 |
| A10= | −1.204E−08 | −1.132E−08 | −9.173E−09 | −1.176E−07 | −4.668E−07 | −4.617E−06 | 3.890E−07 |
| A12= | | | | | | 3.397E−07 | −1.052E−08 |

Wherein, the first lens-group G1, the second lens-group G2 and the third lens-group G3 can be moved between the object side and the image side.

Figure 2:
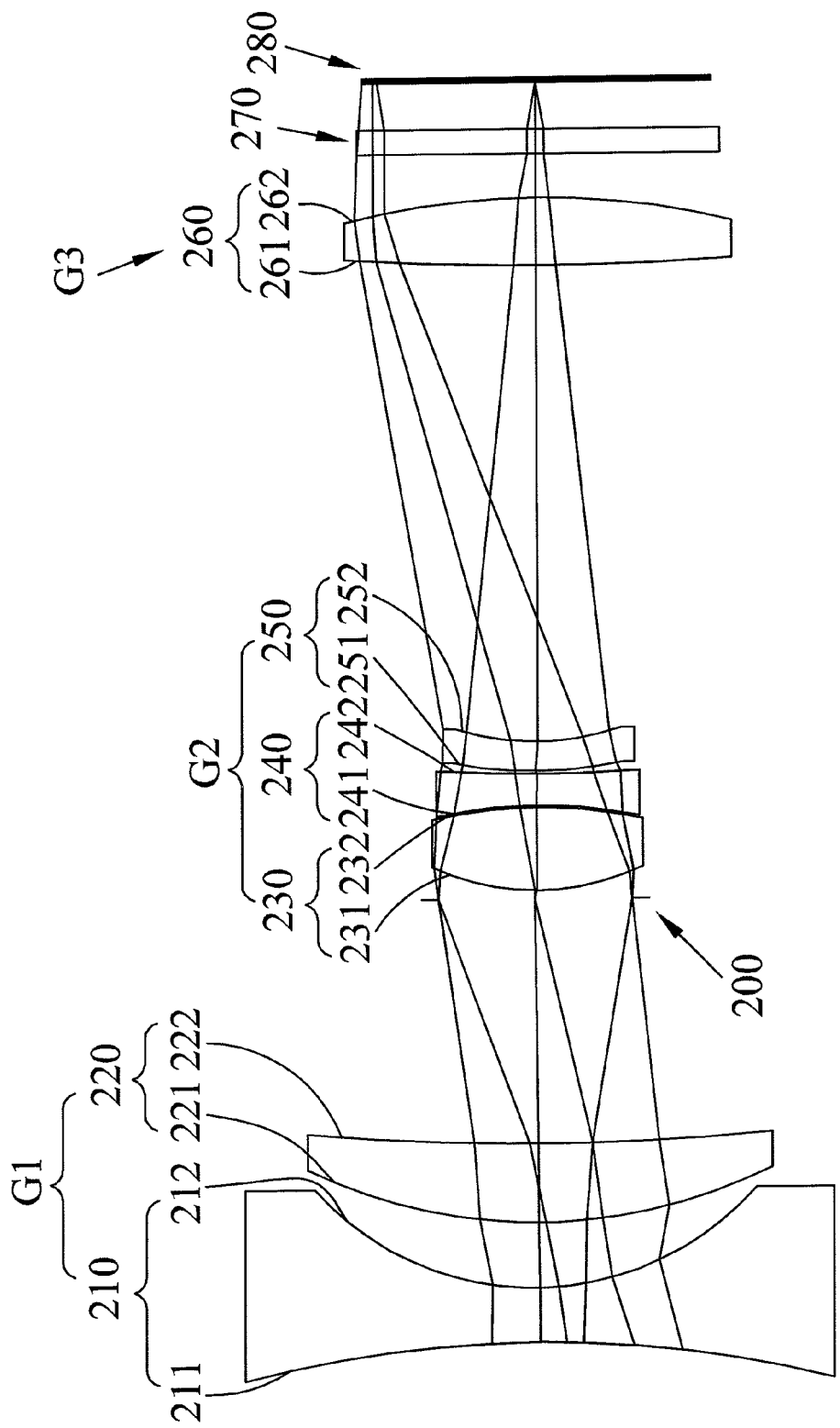
FIG. 2 is a second schematic view of an optical zoom lens assembly of the present invention.

With reference to FIG. 2 for the second schematic view of an optical zoom lens assembly of the present invention, the first lens-group G1 comprises a first lens 210 and a second lens 220, the second lens-group G2 comprises a third lens 230, a fourth lens 240 and a fifth lens 250, and the third lens-group G3 comprises a sixth lens 260. The optical zoom lens assembly, sequentially arranged from an object side to an image side along an optical axis, comprises: a first lens 210 with negative refractive power, made of plastic, having a concave object-side surface 211 and a concave image-side surface 212; a second lens 220 with positive refractive power, made of plastic, having a convex object-side surface 221 and The optical zoom lens assembly comprises three lens-groups, the aperture 200 and the IR-filter 270. The aperture 200 is situated between the first lens-group G1 and the second lens-group G2. The IR-filter 270 is installed between the sixth lens 260 and the image plane 280 and generally made of an optical sheet material that does not affect the focal length of the optical zoom lens assembly of the present invention.

In the optical zoom lens assembly of the present invention, the first lens 210, the second lens 220, the third lens 230, the fifth lens 250 and the sixth lens 260 can be spherical surfaces or aspherical surfaces. For aspherical surfaces, the radius of curvature of the optical surfaces can be used for changing the refractive power to eliminate aberrations, so as to reduce the total length of the optical zoom lens assembly.

TABLE 3

Optical Data of the Second Schematic View
f = 11.2 mm, Fno = 4.76

| Optical Surface | Lens-Group | | Radius of Curvature | Thickness or Distance(mm) | Refractive Index | Abbe No. |
|---|---|---|---|---|---|---|
| 0 | | Object to be photographed | | | | |
| 1 | First lens-group | First lens | −34.165 | 2 | 1.530 | 56.000 |
| 2 | | | 4.81(ASP) | 2 | | |
| 3 | | Second lens | 7.886(ASP) | 2.7 | 1.600 | 27.000 |
| 4 | | | 20.076(ASP) | 8.753 | | |
| 5 | | Aperture | ∞ | 0.3 | | |
| 6 | Second lens-group | Third lens | 4.947(ASP) | 2.7 | 1.530 | 56.000 |
| 7 | | | −9.789 | 0.1 | | |
| 8 | | Fourth lens | −11.616 | 0.6 | 1.600 | 27.000 |
| 9 | | | 13.073 | 0.1 | | |
| 10 | | Fifth lens | 4.0(ASP) | 0.6 | 1.530 | 56.000 |
| 11 | | | 3.659(ASP) | 11.528 | | |
| 12 | Third lens-group | Sixth lens | −85.587(ASP) | 2.2 | 1.530 | 56.000 |
| 13 | | | −13.257(ASP) | 1.5 | | |
| 14 | | IR-filter | ∞ | 0.8 | 1.516 | 64.000 |
| 15 | | | ∞ | 5.38 | | |

Note:
ASP stands for aspherical surface.

With reference to Table 3, the optical zoom lens assembly has a focal length f=11.2 (mm), such that the overall aperture value (f-number) Fno=4.76. Wherein, the second lens-group G2 has a focal length of $f_2$=13.18 (mm), and a third lens 230 of the second lens-group G2 has a focal length of $f_{21}$=6.4 (mm), and the condition: $0.3<f_{21}/f_2<0.8$ is satisfied. It is noteworthy that a material with a refractive index smaller than 1.69 is used to manufacturing the first lens 210, the second lens 220, the third lens 230, the fourth lens 240, the fifth lens 250 and the sixth lens 260, so as to lower the manufacturing cost.

Wherein, the first lens-group G1, the second lens-group G2 and the third lens-group G3 can be moved between the object side and the image side.

Figure 3:
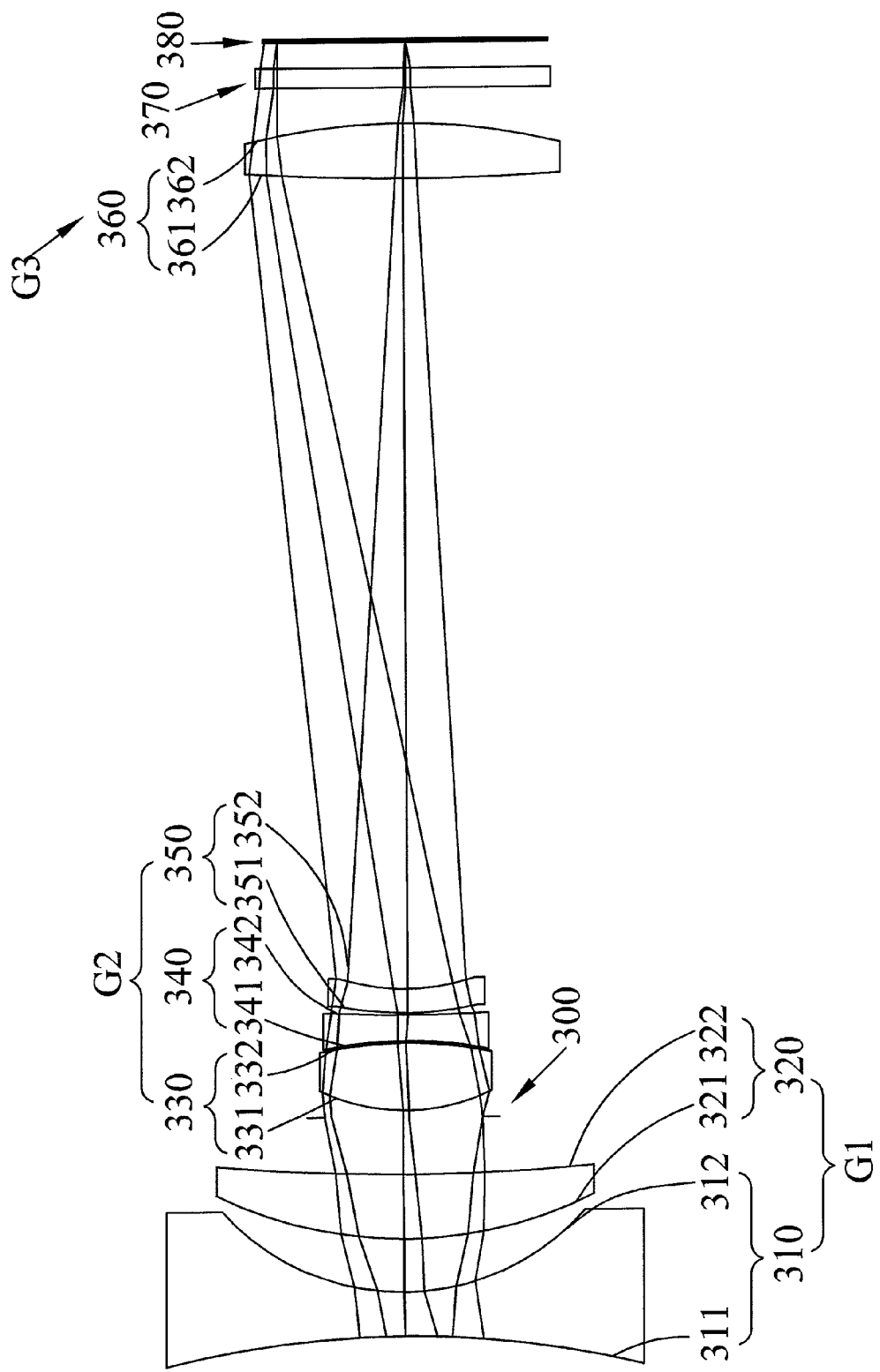
FIG. 3 is a third schematic view of an optical zoom lens assembly of the present invention.

With reference to FIG. 3 for the third schematic view of an optical zoom lens assembly of the present invention, the first lens-group G1 comprises a first lens 310 and a second lens 320, the second lens-group G2 comprises a third lens 330, a fourth lens 340 and a fifth lens 350, and the third lens-group G3 comprises a sixth lens 360. The optical zoom lens assembly, sequentially arranged from an object side to an image side of an optical axis, comprises: a first lens 310 with negative refractive power, made of plastic, having a concave object-side surface 311 and a concave image-side surface 312; a second lens 320 with positive refractive power, made of plastic, having a convex object-side surface 321 and a concave image-side surface 322; an aperture 300; a third lens 330 with positive refractive power, made of plastic, having a convex object-side surface 331 and a convex image-side surface 332; a fourth lens 340 with negative refractive power, made of plastic, having a concave object-side surface 341 and a concave image-side surface 342; a fifth lens 350 with negative refractive power, made of plastic, having a convex object-side surface 351 and a concave image-side surface 352; a sixth lens 360 with positive refractive power, made of plastic, having a concave object-side surface 361 and a convex image-side surface 362; and an IR-filter 370, for adjusting a wavelength section of an image. With the assembly of the first lens-group G1, the second lens-group G2, the third lens-group G3, the aperture 300 and the IR-filter 370, an image of an object to be photographed can be formed on an image plane 380.

The optical zoom lens assembly comprises three lens-groups, the aperture 300 and the IR-filter 370. The aperture 300 is situated between the first lens-group G1 and the second lens-group G2. The IR-filter 370 is installed between the sixth lens 360 and the image plane 380 and generally made of an optical sheet material that does not affect the focal length of the optical zoom lens assembly of the present invention.

In the optical zoom lens assembly of the present invention, the first lens 310, the second lens 320, the third lens 330, the fifth lens 350 and the sixth lens 360 can be spherical surfaces or aspherical surfaces. For aspherical surfaces, the radius of curvature of the optical surface can be used for changing the refractive power to eliminate aberrations, so as to reduce the total length of the optical zoom lens assembly.

TABLE 4

Optical Data of the Third Schematic View
f = 25 mm, Fno = 8.2

| Optical Surface | Lens-Group | | Radius of Curvature | Thickness or Distance(mm) | Refractive Index | Abbe No. |
|---|---|---|---|---|---|---|
| 0 | | Object to be photographed | | | | |
| 1 | First | First lens | −34.165 | 2 | 1.530 | 56.000 |
| 2 | lens-group | | 4.81(ASP) | 2 | | |
| 3 | | Second lens | 7.886(ASP) | 2.7 | 1.600 | 27.000 |
| 4 | | | 20.076(ASP) | 2.476 | | |
| 5 | | Aperture | ∞ | 0.3 | | |
| 6 | Second | Third lens | 4.947(ASP) | 2.7 | 1.530 | 56.000 |
| 7 | lens-group | | −9.789 | 0.1 | | |
| 8 | | | −11.616 | 0.6 | 1.600 | 27.000 |
| 9 | | Fourth lens | 13.073 | 0.1 | | |
| 10 | | | 4.0(ASP) | 0.6 | 1.530 | 56.000 |
| 11 | | Fifth lens | 3.659(ASP) | 29.142 | | |
| 12 | Third | | −85.587(ASP) | 2.2 | 1.530 | 56.000 |
| 13 | lens-group | Sixth lens | −13.257(ASP) | 1.5 | | |
| 14 | | IR-filter | ∞ | 0.8 | 1.516 | 64.000 |
| 15 | | | ∞ | 5.38 | | |

Note:
ASP stands for aspherical surface.

With reference to Table 4, the optical zoom lens assembly has a focal length f=25 (mm), such that the overall aperture value (f-number) Fno=8.2. Wherein, the second lens-group G2 has a focal length of $f_2$, and a third lens 330 of the second lens-group G2 has a focal length of $f_{21}$, and the condition: $0.3<f_{21}/f_2<0.8$ is satisfied. It is noteworthy that a material with a refractive index smaller than 1.69 is used to manufacturing the first lens 310, the second lens 320, the third lens 330, the fourth lens 340, the fifth lens 350 and the sixth lens 360, so as to lower the manufacturing cost.

Wherein, the first lens-group G1, the second lens-group G2 and the third lens-group G3 are moved between the object side and the image side.

Figure 4:
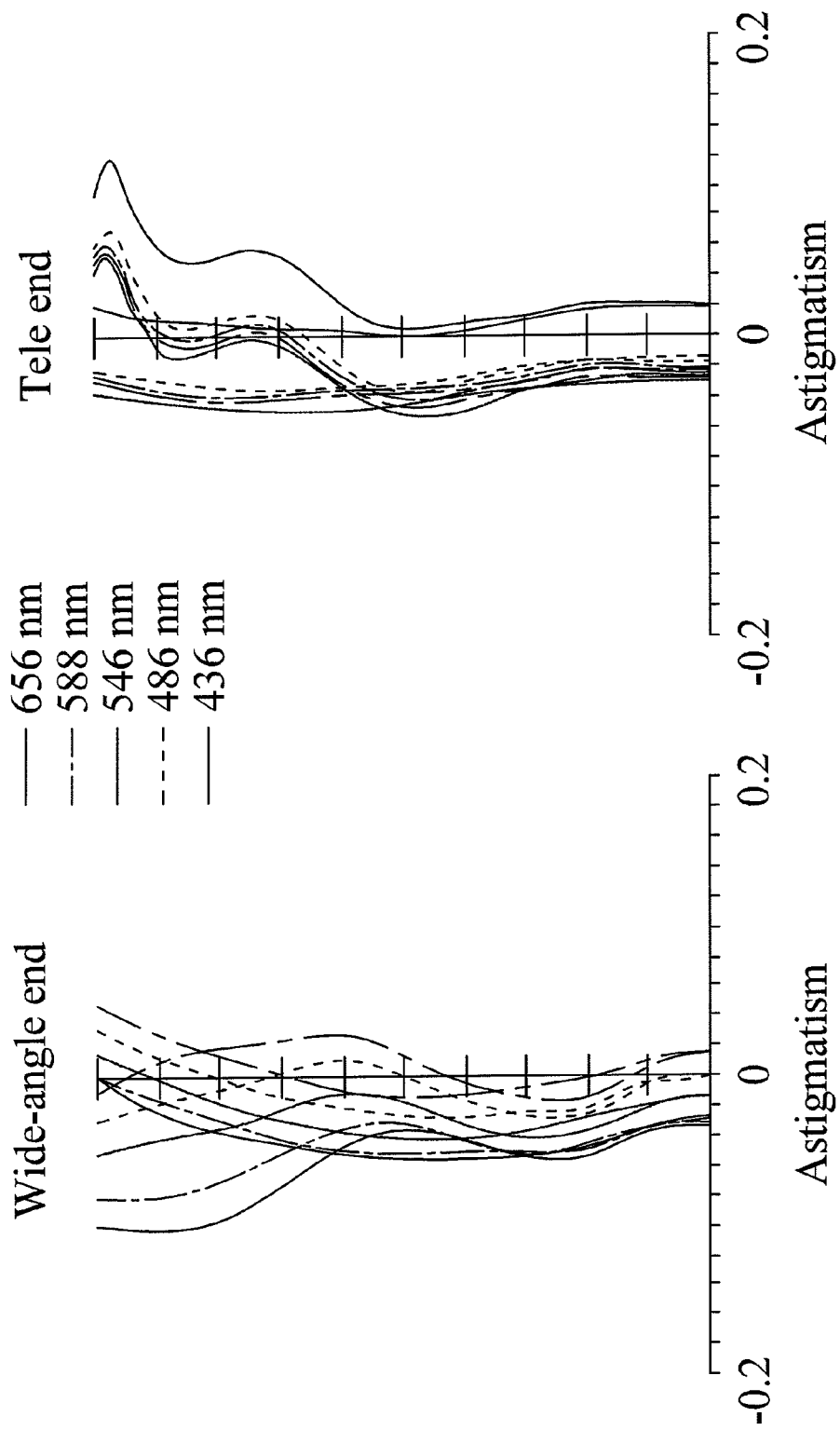
FIG. 4 is an astigmatism curve of an optical zoom lens assembly of the present invention.
Figure 5:
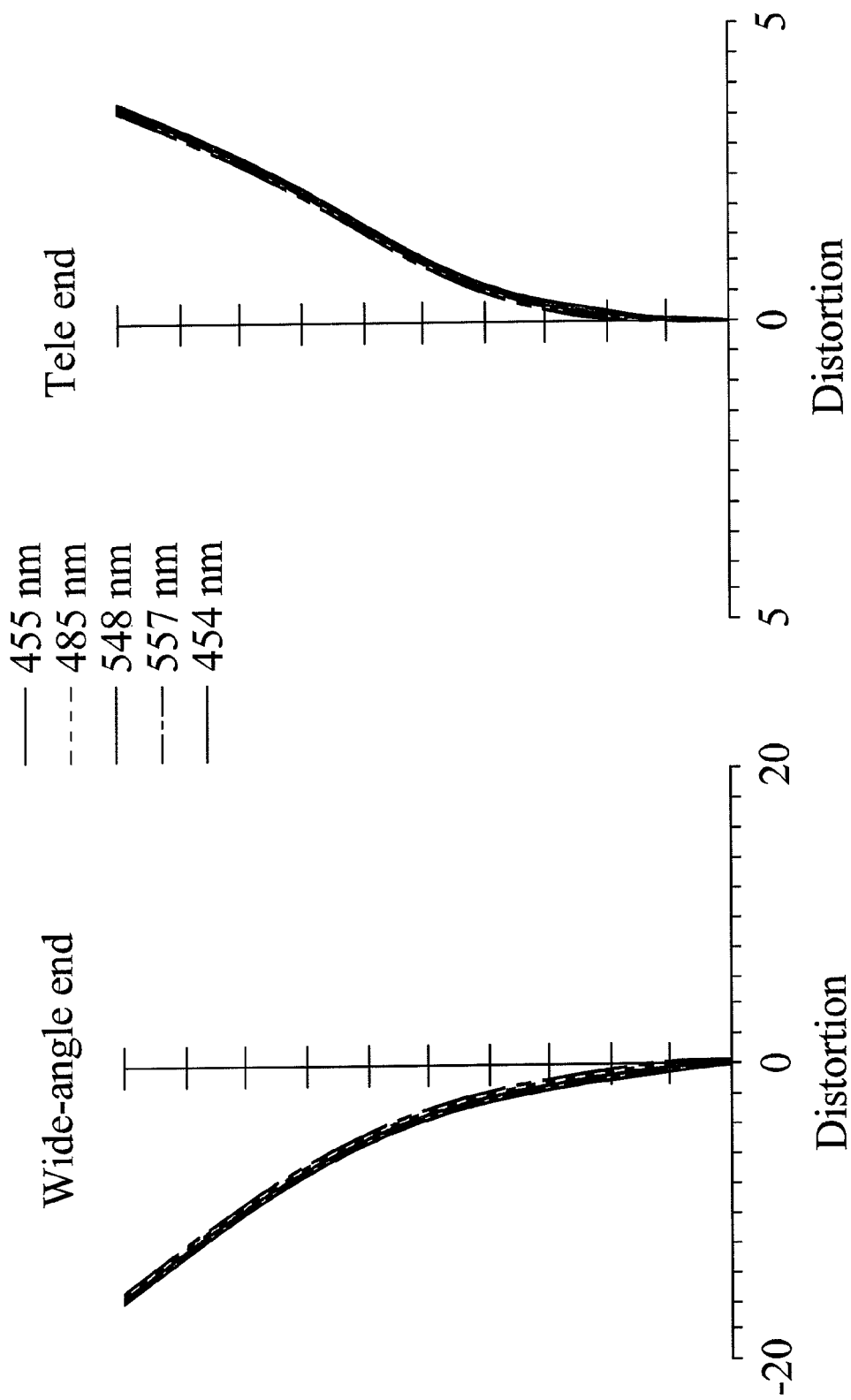
FIG. 5 is a distortion curve of an optical zoom lens assembly of the present invention.
Figure 6:
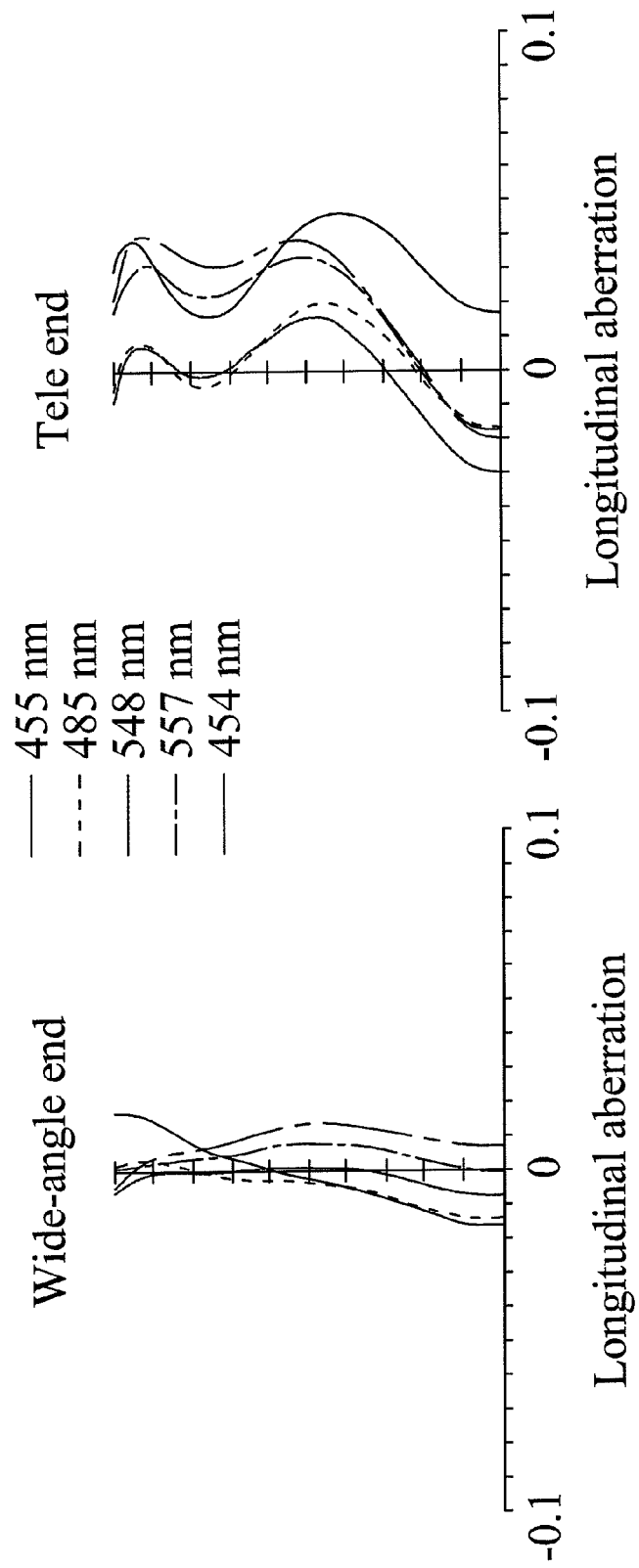
FIG. 6 is a longitudinal aberration curve of an optical zoom lens assembly of the present invention.
Figure 7:
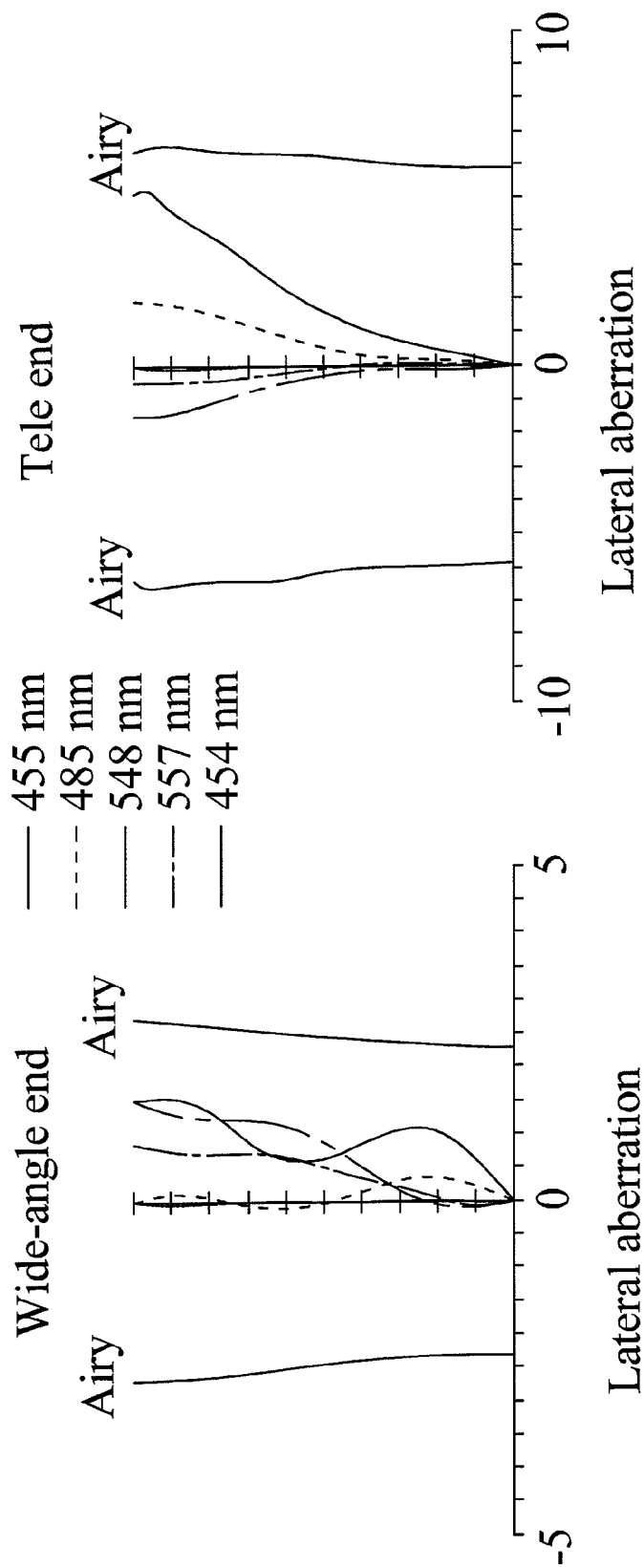
FIG. 7 is a lateral aberration curve of an optical zoom lens assembly of the present invention.

With reference to FIG. 4 for the astigmatism curve of an optical zoom lens assembly of the present invention, the optical zoom lens assembly has a variable focal length ranging from 5 mm to 25 mm, and an overall aperture value (f-number) Fno ranging from 3.3 to 8.5, so that the maximum TTL value of the distance from the object-side surface of the first lens to the image plane on the optical axis is equal to 54 mm. If the distance between the first lens-group and the second lens-group is equal to 22.66 mm, and the distance between the second lens-group and the third lens-group is equal to 4.07 mm, then a wide-angle end is defined; and if the distance between the first lens-group and the second lens-group is equal to 2.476 mm, and the distance between the second lens-group 30 and the third lens-group 40 is equal to 29.142, then a tele end is defined.

In addition, the first lens-group 20 adopts negative refractive power to increase the field of view, and after the first lens-group 20 is combined with the second lens-group 30 with the positive refractive power, the magnification of the image can be increased to enhance the resolution. The third lens-group 40 adopts positive, refractive power to effectively compensate the aberration produced by the first lens-group 20 and the second lens-group 30, such that the aberration and distortion can meet the resolution requirements.

According to Tables 1 to 4 and FIGS. 4 to 7, the optical zoom lens assembly of the present invention provides good correction results in aspects of the field curving, distortion, longitudinal spherical aberration and lateral aberration.

Tables 1 to 4 show changes of values of an optical zoom lens assembly in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical zoom lens assembly, sequentially arranged from an object side to an image side along an optical axis, comprising:
   a first lens-group, with negative refractive power, and including at least one positive lens and at least one negative lens;
   a second lens-group, with positive refractive power, and including at least one positive lens and at least one negative lens; and
   a third lens-group, with positive refractive power, and including at least one aspheric lens;
   wherein each lens of the first lens-group, the second lens-group and the third lens-group has refractive index smaller than 1.69; and
   the second lens-group has a focal length of $f_2$, a third lens of the second lens-group has a focal length of $f_{21}$, and condition: $0.3 < f_{21}/f_2 < 0.8$ is satisfied;
   wherein the second lens-group, sequentially arranged from the object side to the image side along the optical axis comprises the third lens, a fourth lens and a fifth lens; the third lens with positive refractive power has a convex object-side surface and a convex image-side surface; the fourth lens with negative refractive power has a concave object-side surface and a concave image-side surface; and the fifth lens with negative refractive power has a convex object-side surface and a concave image-side surface.

2. The optical zoom lens assembly of claim 1, wherein the first lens-group, sequentially arranged from the object side to the image side along the optical axis, comprises a first lens and a second lens; the first lens with negative refractive power has a concave object-side surface and a concave image-side surface; and the second lens with positive refractive power has a convex object-side surface and a concave image-side surface.

3. The optical zoom lens assembly of claim 2, wherein the image-side surface of the first lens and the object-side surface or the image-side surface of the second lens are aspherical surfaces.

4. The optical zoom lens assembly of claim 1, wherein the object-side surface of the third lens or the object-side surface or the image-side surface of the fifth lens is an aspherical surface.

5. The optical zoom lens assembly of claim 1, wherein the third lens-group includes a sixth lens with positive refractive power having a concave object-side surface and a convex image-side surface.

6. The optical zoom lens assembly of claim 5, wherein the object-side surface or the image-side surface of the sixth lens is an aspherical surface.

7. An optical zoom lens assembly, sequentially arranged from an object side to an image side along an optical axis, comprising:
   a first lens-group, including:
   a first lens, with negative refractive power, and having a concave object-side surface and a concave image-side surface; and
   a second lens, with positive refractive power, and having a convex object-side surface and a concave image-side surface;
   a second lens-group, including:
   a third lens, with positive refractive power, and having a convex object-side surface and a convex image-side surface e;
   a fourth lens, with negative refractive power, and having a concave object-side surface and a concave image-side surface; and
   a fifth lens, with negative refractive power, and having a convex object-side surface and a concave image-side surface; and
   a third lens-group, including:
   a sixth lens, with positive refractive power, and having a concave object-side surface and a convex image-side surface;
   wherein each lens of the first lens-group, the second lens-group and the third lens-group has refractive index smaller than 1.69; and
   the second lens-group has a focal length of $f_2$, and the third lens has a focal length of $f_{21}$, and condition of $0.3 < f_{21}/f_2 < 0.8$ is satisfied.

8. The optical zoom lens assembly of claim 7, wherein the first lens-group has negative refractive power, the second lens-group has positive refractive power, and the third lens-group has positive refractive power.

9. The optical zoom lens assembly of claim 7, wherein one of the image-side surface of the first lens, the object-side surface or the image-side surface of the second lens, the object-side surface of the third lens, the object-side surface or the image-side surface of the fifth lens, and the object-side surface or the image-side surface of the sixth lens are aspherical surfaces.

* * * * *